United States Patent
Asano et al.

(10) Patent No.: US 6,961,198 B2
(45) Date of Patent: Nov. 1, 2005

(54) METHOD AND APPARATUS FOR CONTROLLING DATA READ/WRITE BETWEEN A HARD DISK AND A HARD DISK CONTROLLER

(75) Inventors: Hideo Asano, Tokyo (JP); Rakesh Laroia, Los Gatos, CA (US); Takashi Yamazaki, Kanagawa-ken (JP); Roh Mitsuhashi, Kawasaki (JP)

(73) Assignee: Hitachi Global Storage Technologies Netherlands N.V., Amsterdam (NL)

( * ) Notice: Subject to any disclaimer, the term of this patent is extended or adjusted under 35 U.S.C. 154(b) by 261 days.

(21) Appl. No.: 10/357,568

(22) Filed: Feb. 4, 2003

(65) Prior Publication Data

US 2003/0189780 A1 Oct. 9, 2003

(30) Foreign Application Priority Data

Apr. 3, 2002 (JP) .................................. 2002-101894

(51) Int. Cl.[7] .............................................. G11B 5/02
(52) U.S. Cl. ......................................... 360/55; 710/33
(58) Field of Search ............................ 710/33, 74, 52, 710/58, 60; 360/55; 709/231

(56) References Cited

U.S. PATENT DOCUMENTS

| | | | | | |
|---|---|---|---|---|---|
| 4,609,949 | A | * | 9/1986 | Kutaragi | 386/45 |
| 5,218,689 | A | * | 6/1993 | Hotle | 711/114 |
| 5,507,005 | A | * | 4/1996 | Kojima et al. | 710/52 |
| 6,182,191 | B1 | * | 1/2001 | Fukuzono et al. | 711/111 |

* cited by examiner

*Primary Examiner*—David Hudspeth
*Assistant Examiner*—Daniell L. Negrón
(74) *Attorney, Agent, or Firm*—Robert B. Martin; Lewis L. Nunnelley; Dillon & Yudell LLP

(57) ABSTRACT

An apparatus for controlling data read/write between a hard disk and a hard disk controller is disclosed. The hard disk includes a disk for storing data, multiple read/write heads for reading or writing data onto the disk in accordance with a read request or write request from a requesting device, a non-volatile memory for storing control data in relation to reading data from the disk or writing data to the disk, and a controller for sending the control data to the requesting device in response to a read request or a write request from the requesting device before reading data or writing data.

10 Claims, 5 Drawing Sheets a – buffer transfer clock capability
b – generation ID
c – data sector size
d – Micro code
e – # of physical cylinder
f – # of data sectors in boot zone
g – TPI
h – servo information for boot up
i – channel information

*Fig. 2*

METHOD AND APPARATUS FOR CONTROLLING DATA READ/WRITE BETWEEN A HARD DISK AND A HARD DISK CONTROLLER

RELATED PATENT APPLICATION

The present patent application claims priority to co-pending Japanese Application No. JP 2002-101894, filed on Apr. 3, 2002.

BACKGROUND OF THE INVENTION

1. Technical Field

The present invention relates to disk drives in general, and in particular to hard disks that can be attached and removed at will to/from a hard disk controller. Still more particularly, the present invention relates to a method and apparatus for controlling data read/write between a hard disk and a hard disk controller.

2. Description of the Related Art

Hard disks are widely used as external storage devices for computers. A hard disk is equipped with magnetic heads for reading and writing data from/to a magnetic disk. The magnetic heads are connected to an actuator mechanism whose position is controlled by means of a Voice Coil Motor (VCM). When a magnetic head reads or writes data, the actuator mechanism is operated to move and position the magnetic head on an appropriate track. The movement of the magnetic heads is controlled based on servo information stored on the magnetic disk so that magnetic heads will be placed in position.

FIG. 5 is a block diagram of a conventional hard disk drive (HDD) 31. The HDD 31 is a data storage device in which magnetic heads 34 seek on a magnetic disk 32 that is rotationally driven by a spindle motor 33, and write data to the magnetic disk 32 or read data from the magnetic disk 32.

The magnetic disk 32 is rotationally driven around the spindle axis of the spindle motor 33 controlled by a spindle driver 39 when the HDD 31 is operating, but stops rotating when the HDD 31 is not operating. Positional information storage areas are formed along radial lines on surfaces of the magnetic disk 32 and data storage areas are formed in the remaining areas of the magnetic disk 32. The magnetic heads 34 read this servo information to locate themselves.

Two magnetic heads 34 for the top and bottom surfaces of the magnetic disk 32 are held at a tip of an actuator 35. The magnetic heads 34 read and write data from/to the magnetic disk 32. They also read the servo information from the magnetic disk 32. The magnetic heads 34 move radially over the magnetic disk 32 together with the actuator 35. A ramp (not shown) is provided outside the magnetic disk 32 to park the magnetic heads 34 when they are not driven.

A read/write channel 41 processes data read/write operation. Specifically, read/write channel 41 converts write data transferred from a host computer 50 via an hard disk controller (HDC) 43 into a write signal and supplies it to the magnetic heads 34 via a write driver in a preamplifier 46. Based on the write current, the magnetic heads 34 write data to the magnetic disk 32. On the other hand, a read signal read from the magnetic disk 32 is amplified by the preamplifier 46, converted into digital data by the read/write channel 41, and output to the host computer 50 via the HDC 43.

A servo controller 44 extracts servo information from the read data outputted from the read/write channel 41. The servo controller 44 transfers the extracted servo information to an micro processing unit (MPU) 42. The actuator 35 is driven by a voice coil motor (VCM) 36. The VCM 36 comprises an actuator having a coil and a stator that is made of permanent magnets. As a predetermined current is supplied to the coil from a VCM driver 38, the actuator is driven in such a way that the magnetic heads 34 will be moved to or stopped at a predetermined position on the magnetic disk 32.

The HDC 43 functions as an interface for the HDD 31. The functions of the HDC 43 include receiving the write data transferred from the host computer 50 and transferring the received write data to a buffer 45. The write data stored temporarily in the buffer 45 is read by the HDC 43 and transferred to the read/write channel 41 based on instruction from the MPU 42. Also, the HDC 43 transfers read data received from the read/write channel 41 to the host computer 50.

The MPU 42 and HDC 43 control the function of the HDD 31 in conjunction with each other. The MPU 42 interprets and executes programs stored in a memory (not shown). The MPU 42 determines the position of the magnetic heads 34 based on the servo information transferred from the servo controller 44 and outputs an actuator current for positioning for the magnetic heads 34 to a digital/analog converter (DAC) 37 based on the distance between the determined position of the magnetic heads 34 and a target position.

The DAC 37 converts the actuator current for positioning outputted from the MPU 42 into an analog voltage signal and outputs it to the VCM driver 38. The VCM driver 38 converts the analog voltage signal received from the DAC 37 into a drive current and supplies it to the VCM 36. The above components are contained in a housing and the entire housing is connected to a computer device.

Normally, an HDD connected to a computer device is removed and attached only under exceptional circumstances such as HDD malfunctioning. As far as computer devices are concerned, there has not been much need to attach and detach a large-capacity HDD at will. Storage media that can be attached and removed at will to/from computer devices are available. However, data storage devices as large as an HDD capable of being freely attachable/removable to/from computer devices are not in common use. An HDD that the user can attach and remove freely will be useful, for example, for audio visual (AV) devices. Of course, if a large-capacity HDD can be attached and removed at will to/from computer devices other than AV devices, the user will need to have only a single HDD for two or more computer devices.

When considering a freely attachable/removable HDD, it is necessary to allow for compatibility among generations and reduce costs by minimizing the number of parts so that users can use it easily. Consequently, it would be desirable to provide an improved method and apparatus for controlling data read/write between a hard disk and a hard disk controller.

SUMMARY OF THE INVENTION

In order to configure an HDD to be freely attachable/removable, it is important to maintain compatibility, especially compatibility among generations, with the mating HDD controller. More specifically, the convenience of users can be improved by ensuring compatibility (backward compatibility) with HDDs of older generations and compatibility (forward compatibility) with HDDs of newer generations than the given HDD controller.

To achieve the two types of compatibility, it is useful to provide the freely attachable/removable HDD with a program for operating the MPU and HDC or control data such as parameters for controlling the operation of the HDD. Then, when the HDD is connected to an HDD controller, the control data is transferred from the HDD to the HDD controller connected with the HDD. The MPU and HDC in the HDD controller can control the operation of the connected HDD based on the transferred control data.

The present invention, which is based on the above observation, provides a hard disk that includes a disk for storing data, multiple read/write heads for reading or writing data onto the disk in accordance with a read request or write request from a requesting device, a non-volatile memory for storing control data in relation to reading data from the disk or writing data to the disk, and a controller for sending the control data to the requesting device in response to a read request or a write request from the requesting device before reading data or writing data.

The hard disk of the present invention also includes a buffer that receives the write data transferred via the controller and stores the write data temporarily. This is necessary in order to adjust any difference in data processing speed between the hard disk and the hard disk controller. Based on certain conditions, the controller controls whether: the write data is transferred to the read/write head after being temporarily stored in the buffer; or the write data is transferred to the read/write head without being temporarily stored in the buffer. If the data processing speeds of the hard disk and the hard disk controller are identical, the read data can be transferred smoothly between the hard disk and the hard disk controller without using a buffer.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 2 shows control information stored in a nonvolatile memory in an HDD according to a preferred embodiment;

DETAILED DESCRIPTION OF A PREFERRED EMBODIMENT

Figure 1:
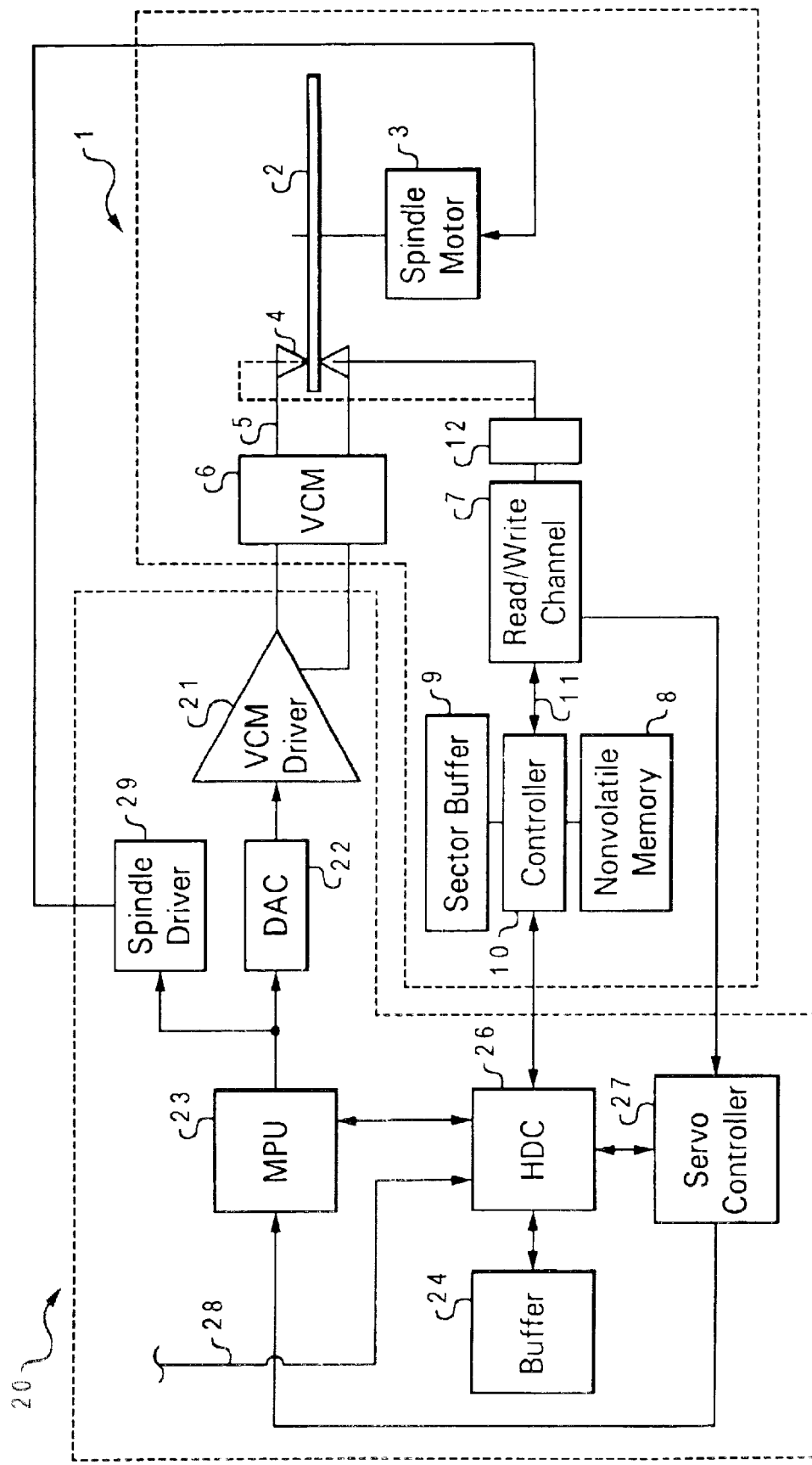
FIG. 1 is a block diagram of an HDD and a HDD controller according to a preferred embodiment of the present invention.

FIG. 1 is a block diagram showing main components of a hard disk drive (HDD) 1 and a HDD controller 20 according to a preferred embodiment. The HDD 1 in FIG. 1 can be attached and removed at will to/from the HDD controller 20 by means of a connector (not shown). The HDD controller 20 may be a computer, AV device, or other HDD controller irrespective of its specific use, provided it can use information stored in the HDD 1.

Figure 5:
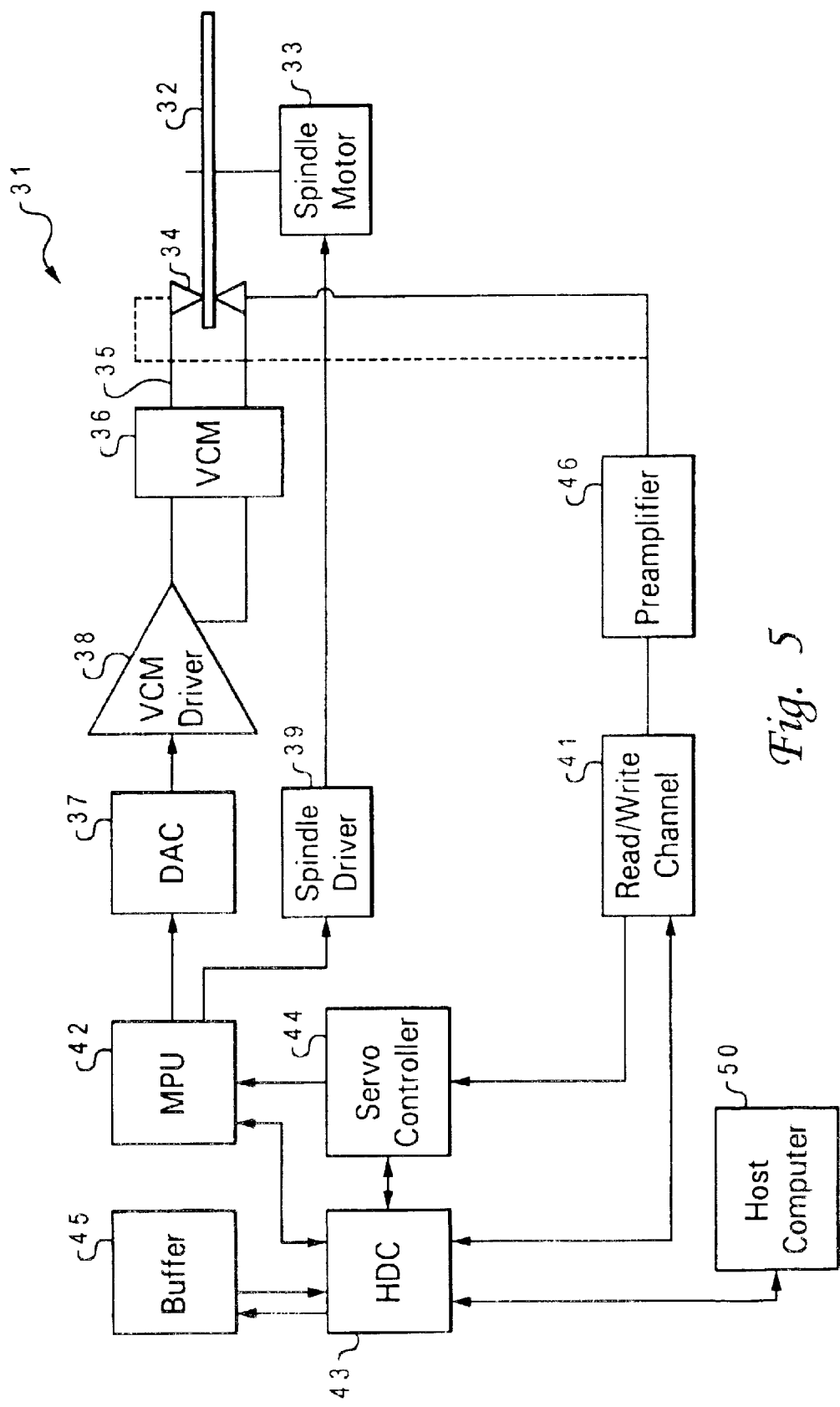
FIG. 5 is a block diagram of a conventional HDD.

Regarding the HDD 1, the cost of the HDD 1 is reduced by transferring some components of the conventional HDD 31 shown in FIG. 5 to the HDD controller 20. However, compatibility across generations cannot be ensured by simply transferring some components to the HDD controller 20. Thus, as described in detail later, while the HDD 1 possesses sufficient information to ensure compatibility across generations, the HDD controller 20 is provided with an hard disk controller (HDC) 26 for controlling the operation of the HDD 1 based on such information. Assuming a situation in which it is not possible to match data processing speeds completely between the HDD controller 20 and the HDD 1 even if compatibility across generations is ensured, the HDD 1 is provided with a sector buffer 9 for adjusting the data processing speeds. The above are main features in the configurations of the HDD 1 and HDD controller 20 according to the present invention. The configurations of the HDD 1 and HDD controller 20 will be described more specifically below with reference to FIG. 1. Incidentally, basic operation of the HDD 1 is similar to that of the HDD 31 shown in FIG. 5, and thus it will be touched upon in the following description only when necessary.

As shown in FIG. 1, the HDD 1 comprises a magnetic disk 2 that is rotationally driven by a spindle motor 3 controlled by a spindle driver 29. Magnetic heads 4 that write and read data to/from the magnetic disk 2 are disposed in opposing relation to each other above the top and bottom surfaces of the magnetic disk 2. The magnetic heads 4 are held at a tip of an actuator 5 which is driven together with a voice coil motor (VCM) 6.

A control area of the magnetic disk 2 stores a program for allowing the HDD 1 to read and write data. Such program, when read by the magnetic heads 4, is transferred to the HDD controller 20 as described later. A read/write channel 7 executes data read/write processes. Specifically, read/write channel 7 converts transferred write data into a write signal and supplies the write signal to the magnetic heads 4 via a write driver in a preamplifier 12. Based on such write signal, the magnetic heads 4 write data to the magnetic disk 2. On the other hand, a read signal read from the magnetic disk 2 is amplified by the preamplifier 12, converted into digital data by the read/write channel 7, and output to a controller 10. The controller 10 is connected to a nonvolatile memory 8 and a sector buffer 9 on a bus coupled to the read/write channel 7.

The nonvolatile memory 8 stores nine types of data a to i as shown in FIG. 2. These are data (hereinafter referred to as the control data) needed for the HDC 26 in the HDD controller 20 to control the operation of the HDD 1. When the HDD 1 is connected to the HDD controller 20, the control data are read by the controller 10 and transferred to a predetermined area in the HDC 26 or a buffer 24. Of data a to i shown in FIG. 2, data a to c are characteristic of a preferred embodiment while data d to i also exist in the conventional HDD 31. However, their storage locations differ from conventional ones.

In FIG. 2, data a "buffer transfer clock capability" defines the processing speed for read data or write data (read/write data) in the sector buffer 9. Based on such data, the HDC 26 determines whether to use the sector buffer 9 in data transfer and specifies the data transfer rate.

Data b "generation ID" defines the generation of the HDD 1, and identifies the generation—such as the first generation or second generation—in which the HDD 1 was produced. Based on such data, the HDC 26 of the HDD controller 20 can recognize the generation of the HDD 1.

Data c "data sector size" defines a unit of storage of read/write data in the HDD 1. Conventional (current) HDDs 1 use 512 bytes as a unit of storage, meaning that read/write data is transferred when 512 bytes of read/write data are accumulated. However, there is no guarantee that the unit will remain unchanged. Thus, "data sector size" is stored in the nonvolatile memory 8 to allow the HDD controller 20 to handle units of storage other than 512 bytes.

Data d "Micro code" is a program (hereinafter referred to as program A) for reading a predetermined program for the HDD 1 from the magnetic disk 2. The predetermined program (hereinafter referred to as program B) is a program which allows the HDD 1 to read or write user data to/from the magnetic disk 2 at the instruction of the HDD controller 20. When the HDD 1 is connected, the HDC 26 of the HDD controller 20 reads program B from the magnetic disk 2 based on "micro code."

As shown in FIG. 2, the nonvolatile memory 8 also stores data e to i described below. However, since these data have been used conventionally as described above, description thereof will be kept to a minimum.

Data e "# of physical cylinders" indicates the number of cylinders in the magnetic disk 2. Data f "# of data sectors in boot zone" means the number of data sectors in the zone where the predetermined program described above is stored. Data g "TPI" means the number of tracks per inch of the magnetic disk 2. Data h "servo information for boot up" contains servo control information, such as servo gains and servo sampling rates, needed when running processes which allow user data to be read or written to/from the magnetic disk 2. Data i "channel information" contains the data processing speed of the read/write channel 7 and other information which is needed to control the read/write channel 7.

The sector buffer 9 is installed to adjust any difference between the read/write data processing speed of the read/write channel 7 and data processing speed of the HDC 26 of the HDD controller 20.

According to the present embodiment, since the data described above are stored in the nonvolatile memory 8 and the operation of the HDD 1 is controlled by the HDC 26 of the HDD controller 20 based on the stored data, there is compatibility between the HDD 1 and HDD controller 20 across generations. However, if the HDD 1 and HDD controller 20 are from different generations, they may differ in read/write data processing speed. To avoid adverse consequences this situation would have for data transfer, the sector buffer 9 is provided.

The HDC 26 of the HDD controller 20 can adjust itself to lower its data processing speed, but there is a limit. Suppose, for example, the HDD controller 20 has a faster data processing speed because it belongs to a newer generation than the HDD 1. Suppose also that write data is transferred directly from the HDD 1 to the read/write channel 7 of the HDD controller 20. Then, the read/write channel 7 of the HDD 1 cannot process the write data in time and the HDD controller 20 will experience delays in receiving write data. Conversely, suppose the HDD 1 has a faster data processing speed because it belongs to a newer generation than the HDD controller 20. Then, the HDC 26 cannot process the read data from the magnetic disk 2 fast enough and the HDD 1 will experience delays in receiving read data.

The sector buffer 9 stores read/write data in sectors to keep up with the HDD 1 that transfers the read/write data in sectors. The number of sectors for storing read/write data in the sector buffer 9 may be determined, taking costs into consideration, in such a way that the HDD 1 and the HDD controller 20 can carry out read/write processes smoothly.

The controller 10 reads the control data described above from the nonvolatile memory 8 and transfers the control data to the HDC 26 of the HDD controller 20. Also, the controller 10 stores read data transferred from the read/write channel 7 or write data transferred from the HDC 26 of the HDD controller 20 temporarily in the sector buffer 9 as required. The term "as required" is used here because typically there is no need for buffering by means of the sector buffer 9 if the HDD 1 and HDD controller 20 have the same data processing speed, such as when the HDD 1 and HDD controller 20 belong to the same generation. In such a case, the controller 10 transfers the read data received from the read/write channel 7 directly to the HDC 26 of the HDD controller 20 without storing it temporarily in the sector buffer 9. Also, it transfers the write data received from the HDC 26 of the HDD controller 20 directly to the read/write channel 7 without storing it temporarily in the sector buffer 9. A read/write operation carried out in such a way without using the sector buffer 9 will be referred to as a pass-through operation.

Some components of the HDD controller 20 are similar to those of the conventional HDD 31 and they serve basically the same functions as those in the HDD 31. Therefore, description will be given below mainly about functions unique to the present embodiment. Incidentally, FIG. 1 shows only those components of the HDD controller 20 that are needed to drive the HDD 1 as described above, but that does not rule out addition of other components.

The HDD controller 20 is provided with the HDC 26. The HDC 26 controls the HDD 1 in conjunction with an MPU 23 as is the case with the HDD 31 shown in FIG. 5. The HDC 26 is connected with an interface 28, through which write data addressed to the HDD 1 is transferred to the HDC 26 and read data from the HDD 1 is transferred to the HDC 26. The termination of the interface 28 is connected with equipment which uses the read data and/or write data.

The buffer 24 connected to the HDC 26 temporarily stores write data transferred via the interface 28. The write data stored temporarily is read by the HDC 26 and transferred to the controller 10 of the HDD 1 based on instructions from the MPU 23. In so doing, the HDC 26 performs data transfer when write data equivalent in volume to the sector size is accumulated. The buffer 24 has an area for storing the data stored in the nonvolatile memory 8 of the HDD 1. Furthermore, the buffer 24 has an area for storing the above-mentioned predetermined program which allows user data to be read or written to/from the magnetic disk 2. When the HDD 1 is connected to the HDD controller 20, this program is read by the HDD 1, transferred to the HDC 26 of the HDD controller 20 via the controller 10, and stored in a predetermined area in the buffer 24.

A servo controller 27 extracts servo information from the read data outputted from the read/write channel 7. The servo information is provided to the servo controller 27, bypassing the controller 10. The extracted servo information is transferred to the MPU 23.

The MPU 23 determines the position of the magnetic heads 4 of the HDD 1 based on the servo information transferred from the servo controller 27, generates an actuator current for positioning for the magnetic heads 4 based on the distance between the determined position of the magnetic heads 4 and a target position, and outputs it to a digital/analog converter (DAC) 22. The DAC 22 converts the actuator current for positioning outputted by the MPU 23 into an analog signal (voltage signal) and outputs it to a VCM driver 21. The VCM driver 21 converts the voltage signal received from the DAC 22 into a drive current and supplies it to the VCM 6.

The operations performed when the HDD 1 is connected to the HDD controller 20 are roughly classified into determination of a data transfer mode and subsequent processes. The procedures for determining a data transfer mode are shown in FIG. 3 and subsequent processes are shown in FIG. 4.

The determination of a data transfer mode here means the process of determining which the controller 10 of the HDD 1 will use, the pass-through operation described earlier or the sector buffer 9. Hereinafter, the mode in which data transfer is performed by means of a pass-through operation will be referred to as a pass-through mode and the mode in which data transfer is performed using the sector buffer 9 will be referred to as a sector buffer mode. Specific procedures for determining a data transfer mode are shown in FIG. 3.

Figure 3:
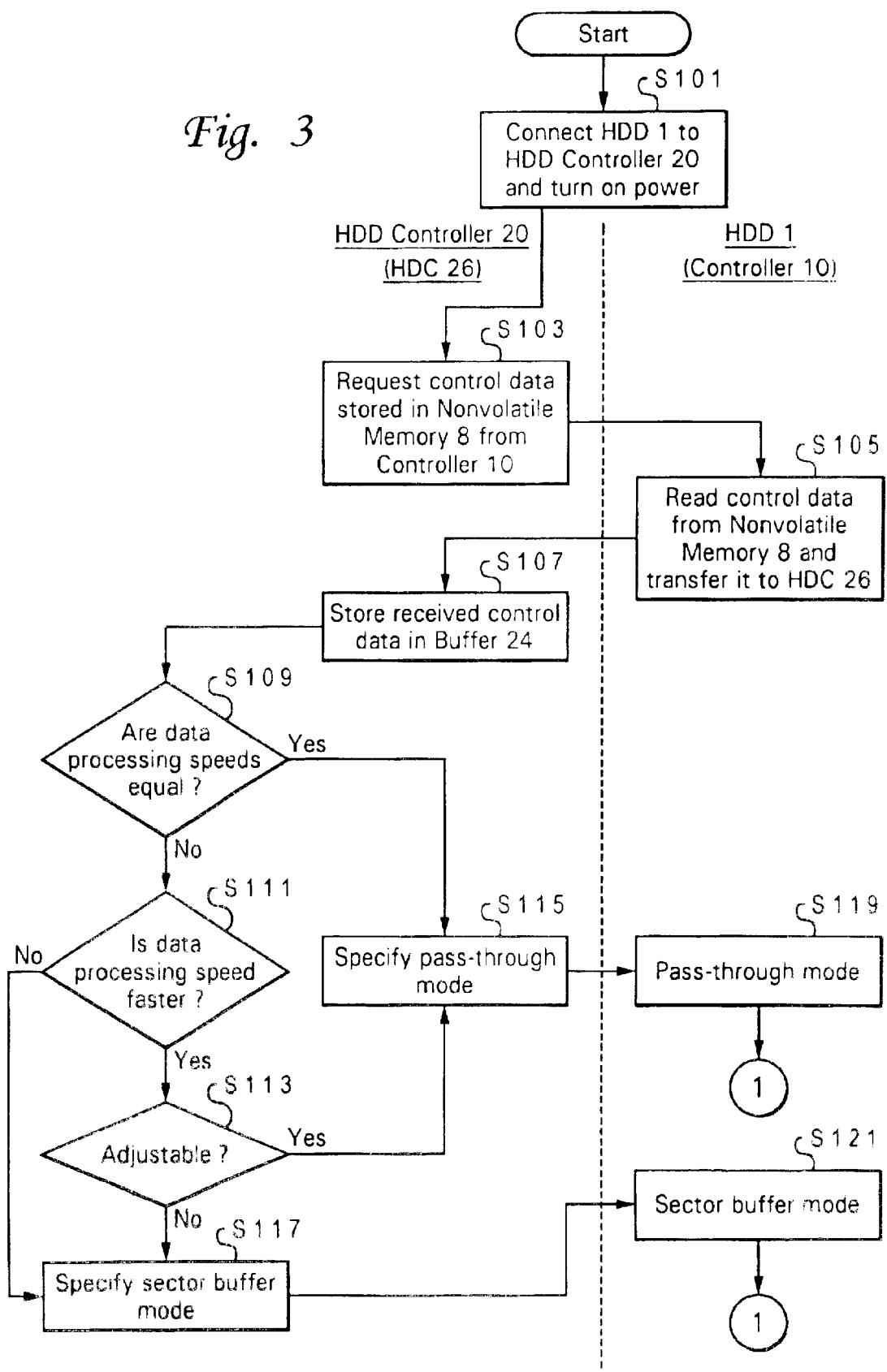
FIG. 3 is a flowchart showing a method for determining a data transfer mode according to a preferred embodiment.
Figure 4:
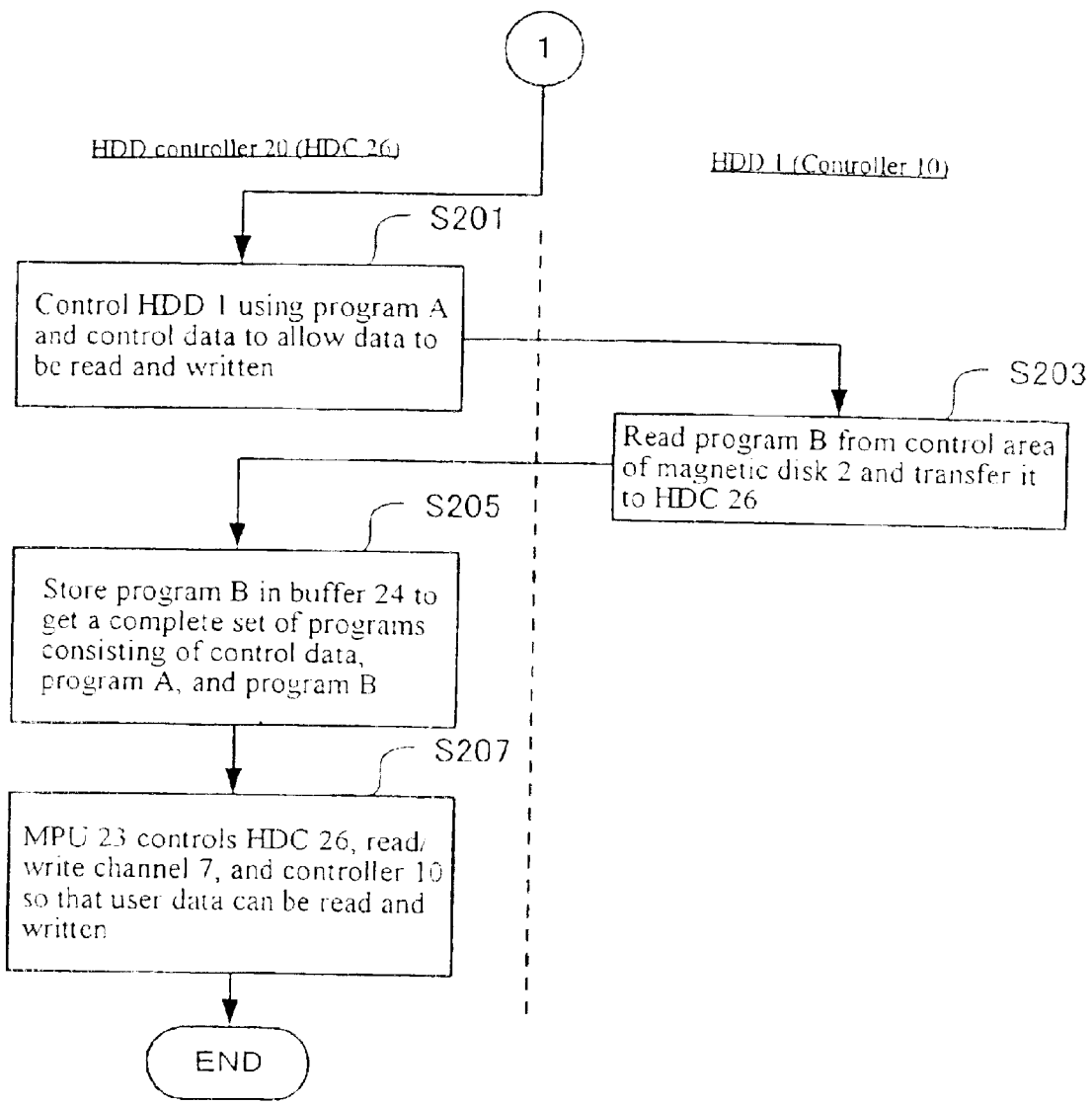
FIG. 4 is a flowchart showing the steps subsequent to the determination of a data transfer mode according to a preferred embodiment.

In FIG. 3, steps on the left side represent operations of the HDD controller 20 (mainly the HDC 26) while steps on the right side represent operations of the HDD 1 (mainly the controller 10). When the HDD 1 is connected to the HDD controller 20 and the power is turned on (S101 in FIG. 3), the HDC 26 of the HDD controller 20 requests the controller 10 of the HDD 1 to read and transfer control data stored in the nonvolatile memory 8 (S103 in FIG. 3).

The controller 10 of the HDD 1 reads the control data out of the nonvolatile memory 8 and transfers it to the controller 10 (S105 in FIG. 3). The HDC 26 stores the received control data in the buffer 24 (S107 in FIG. 3).

The HDC 26 compares "generation ID" it possesses (hereinafter referred to as the generation ID of the HDC 26) with "generation ID" stored in the buffer 24 (hereinafter referred to as the generation ID of the HDD 1), and thereby determines whether the data processing speed of the HDC 26 in the HDD controller 20 agrees with the data processing speed of the read/write channel 7 in the HDD 1 (S109 in FIG. 3).

It is assumed here, as described above, that the older the "generation ID," the slower the data processing speed. Therefore, if the generation ID of the HDC 26 is older than the generation ID of the HDD 1, it follows that the data processing speed of the HDC 26 is slower than the data processing speed of the read/write channel 7 in the HDD 1.

If the data processing speed of the HDC 26 in the HDD controller 20 agrees with the data processing speed of the read/write channel 7 in the HDD 1, the HDC 26 specifies pass-through mode because there is no need to use the sector buffer 9 (S115 in FIG. 3).

Next, the HDC 26 determines whether the data processing speed of the HDC 26 in the HDD controller 20 is faster than the data processing speed of the read/write channel 7 in the HDD 1 (S111 in FIG. 3). If the data processing speed of the HDC 26 in the HDD controller 20 is faster than the data processing speed of the read/write channel 7 in the HDD 1, the HDC 26 proceeds step S113. Otherwise, when the data processing speed of the HDC 26 in the HDD controller 20 is slower than the data processing speed of the read/write channel 7 in the HDD 1, the HDC 26 specifies sector buffer mode (S117 in FIG. 3).

If it is determined in S111 that the data processing speed of the HDC 26 in the HDD controller 20 is faster than the data processing speed of the read/write channel 7 in the HDD 1, the HDC 26 determines in S113 whether the data processing speed of the HDC 26 can be adjusted to the data processing speed of the read/write channel 7 in the HDD 1. If it can be adjusted, the HDC 26 specifies pass-through mode (S115 in FIG. 3). If it cannot be adjusted, the HDC 26 specifies sector buffer mode (S117 in FIG. 3).

The HDD 1 enters the pass-through mode or sector buffer mode, whichever is specified (S119 and S121 in FIG. 3). Incidentally, although generation IDs are used here to compare processing speeds, other data may also be used as long as processing speeds can be compared. For example, it is also possible to use data a "buffer transfer clock capability" in FIG. 2. This completes the process of determining a data transfer mode and then the processes shown in FIG. 4 are executed.

The HDC 26 controls the HDD 1 using program A (d in FIG. 2) and control data stored in the buffer 24 to allow data to be read from and written into the magnetic disk 2 (S201 in FIG. 4). Next, the controller 10 of the HDD 1 reads program B from the control area of the magnetic disk 2 and transfers it to the HDC 26 of the HDD controller 20 (S203 in FIG. 4).

The HDC 26 stores program B in the buffer 24. Thus, the HDC 26 gets a complete set of programs consisting of the control data, program A, and program B (S205 in FIG. 4). Using this complete set of programs, the MPU 23 controls the HDC 26, the read/write channel 7, and the controller 10 so that user data can be read from and written into the magnetic disk 2 via the interface 28 (S207 in FIG. 4).

Through the sequence of operations described above, the HDD 1 can write or read data to/from the magnetic disk 2. For example, if write data is transferred from the interface 28 to the HDC 26 in sector buffer mode, the HDC 26 temporarily stores the write data in the buffer 24. Then, the HDC 26 reads out the write data from the buffer 24 according to instructions from the MPU 23. The write data read out is transferred to the controller 10 of the HDD 1 in sectors of the predetermined size. The controller 10 temporarily stores the received write data in sequence in the sector buffer 9. The write data stored temporarily in the sector buffer 9 is sent out from the sector buffer 9 in the order in which they were stored. The write data sent out is written by the magnetic heads 4 into the magnetic disk 2 via the controller 10 and read/write channel 7.

If a read request is transferred from the interface 28 to the HDC 26 in sector buffer mode, the HDC 26 transfers the read request to the read/write channel 7 via the controller 10. The read/write channel 7 reads appropriate data from the magnetic disk 2 with the magnetic heads 4 according to the read request. The read/write channel 7 transfers the acquired read data to the controller 10. The controller 10 stores the received read data in the sector buffer 9 in sequence. The read data stored temporarily in the sector buffer 9 is sent out from the sector buffer 9 in the order in which they were stored. The read data sent out is transferred to the HDC 26 via the controller 10.

Incidentally, read and write processes are performed using also the various control data shown in FIG. 2.

In the above example, it has been assumed that the data processing speed of the HDC 26 is fixed. However, as described above, the data processing speed of the HDC 26 may vary. In such a case, even if the data processing speed of the HDC 26 is faster than that of the HDD 1, the read data in the HDD 1 can be handled in pass-through mode by lowering the data processing speed of the HDC 26.

Also, in the above example, the selection between the pass-through mode and sector buffer mode is made based on a simple comparison in terms of whether data processing speed is "faster" or "slower." Alternatively, it is also possible to predetermine an acceptable processing-speed difference for deciding on the pass-through mode.

As has been described, the present invention provides a disk drive unit that can be attached and removed at will to/from HDD controllers including computer devices. Also, the present invention provides an HDD controller that can use such a disk drive unit.

While the invention has been particularly shown and described with reference to a preferred embodiment, it will be understood by those skilled in the art that various changes in form and detail may be made therein without departing from the spirit and scope the invention.

What is claimed is:

1. A method for controlling data read/write between a hard disk and a hard disk controller, said method comprising:
   requesting control data from a non-volatile memory within said hard disk by said hard disk controller;
   determining whether data processing speed of said hard disk equals to data processing speed of said hard disk controller, in accordance with said control data;
   in a determination that said data processing speed of said hard disk equals to said data processing speed of said hard disk controller, transferring data between said hard disk and said disk controller via a pass-through mode;
   in a determination that said data processing speed of said hard disk does not equal to said data processing speed of said hard disk controller, determining whether said data processing speed of said hard disk controller is faster than said data processing speed of said hard disk;
   in a determination that said data processing speed of said hard disk controller is slower than said data processing speed of said hard disk transferring data between said hard disk and said hard disk controller via a sector buffer mode; and
   in a determination that said data processing speed of said hard disk is faster than said data processing speed of said hard disk controller, determining whether said data processing speed of said hard disk controller is adjustable.

2. The method of claim 1, wherein said method further includes in a determination that said data processing speed of said hard disk controller is adjustable, transferring data said hard disk and said hard disk controller via said pass-through mode.

3. The method of claim 2, wherein said method further includes in a determination that said data processing speed of said hard disk controller is not adjustable, transferring data between said hard disk and said hard disk controller via said sector buffer mode.

4. The method of claim 1, wherein said pass-through mode includes transferring data between said disk and said hard disk controller without utilizing a buffer.

5. The method of claim 1, wherein said sector buffer mode includes transferring data between said hard disk and said hard disk controller without utilizing a buffer.

6. An apparatus for controlling data read/write between a hard disk and a hard disk controller, said apparatus comprising:
   means for requesting control data from a non-volatile memory within said hard disk by said hard disk controller;
   means for determining whether data processing speed of said hard disk equals to data processing speed of said hard disk controller, in accordance with said control data;
   in a determination that said data processing speed of said hard disk equals to said data processing speed of said hard disk controller, means for transferring data between said hard and said hard disk controller via a pass-through mode;
   in determination that said data processing speed of said hard disk does not equal to said data processing speed of said hard disk controller, means for determining whether said data processing speed of said hard disk controller is faster than said data processing speed of said hard disk;
   in a determination that said data processing speed of said hard disk controller is slower than said data processing speed of said hard disk; means for transferring data between a hard disk and said hard disk controller via a sector buffer mode; and
   in a determination that said data processing speed of said bard disk is faster than said data processing speed of said hard disk controller, means for determining whether said data processing speed of said hard disk controller is adjustable.

7. The apparatus of claim 6, wherein said apparatus further includes in a determination that said data processing speed of said hard disk controller is adjustable, means for transferring data between said hard disk and hard disk controller via said pass-though mode.

8. The apparatus of claim 7, wherein said apparatus further includes in a determination that said data processing speed of said hard disk controller is not adjustable, means for transferring data between said hard disk and said hard disk controller via said sector buffer mode.

9. The apparatus of claim 6, wherein said pass-through mode includes transferring data between said hard disk controller without utilizing a buffer.

10. The apparatus claim 6, wherein said sector buffer mode includes transferring data between said hard disk and said herd disk controller utilizing a buffer.

* * * * *

UNITED STATES PATENT AND TRADEMARK OFFICE
CERTIFICATE OF CORRECTION

PATENT NO. : 6,961,198 B2  Page 1 of 1
APPLICATION NO. : 10/357568
DATED : November 1, 2005
INVENTOR(S) : Asano et al.

It is certified that error appears in the above-identified patent and that said Letters Patent is hereby corrected as shown below:

In Claim 1, at column 9, line 32, between "disk" and "transferring" insert --,--.

In Claim 2, at column 9, line 42 - 43, between "transferring data" and "said hard disk and" insert --between--.

In Claim 6, at column 10, line 31, delete "bard" and insert --hard--.

In Claim 10, at column 10, line 50, delete "herd" and insert --hard--.

Signed and Sealed this

Nineteenth Day of September, 2006

JON W. DUDAS
*Director of the United States Patent and Trademark Office*